Figure 1:
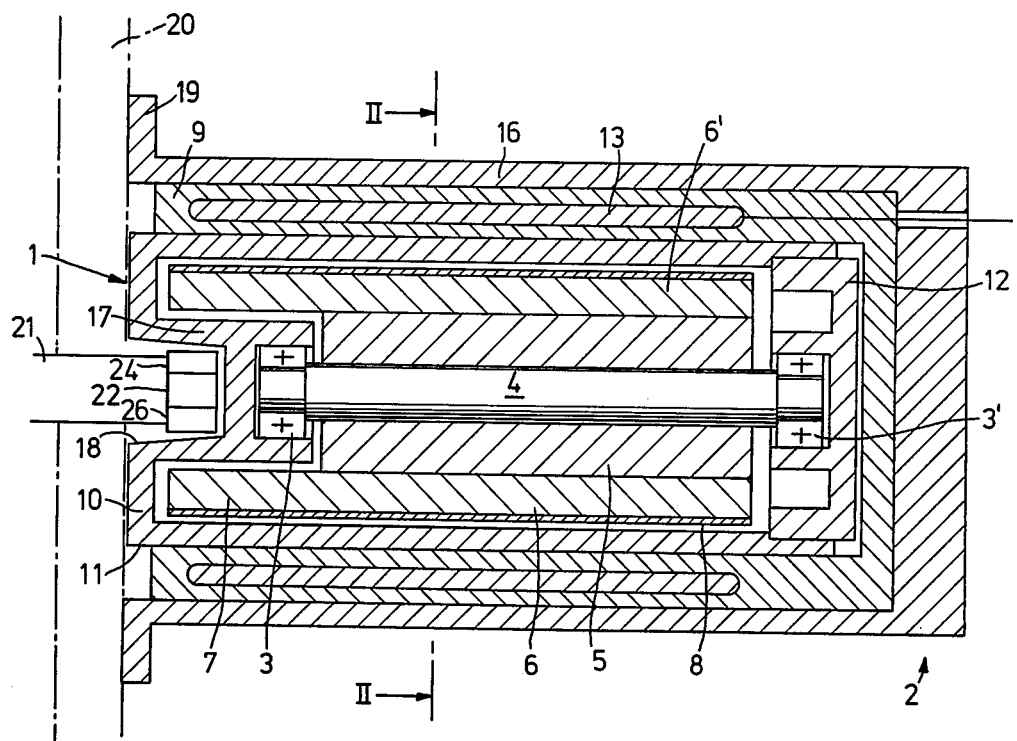

United States Patent [19]

Tardieu et al.

[11] Patent Number: 4,482,829
[45] Date of Patent: Nov. 13, 1984

[54] BRUSHLESS ELECTRIC MICROMOTOR

[75] Inventors: Pierre R. Tardieu, Chateauneuf-sur-Sarthe; Yves H. Mulet-Marquis, Le Lion d'Angers, both of France

[73] Assignee: Kollmorgen Technologies Corporation, Dallas, Tex.

[21] Appl. No.: 433,526

[22] Filed: Oct. 8, 1982

[30] Foreign Application Priority Data

Oct. 8, 1981 [FR] France ................ 81 18980

[51] Int. Cl.³ .......................... H02K 49/02
[52] U.S. Cl. .................... 310/105; 310/40 MM; 310/45; 310/86; 310/88; 310/89; 310/156; 310/181
[58] Field of Search .............. 310/40 MM, 156, 88, 310/43, 92, 167, 103, 41, 104, 164, 166, 262, 167, 269, 85, 90, 86, 154, 105, 106, 107, 108, 109, 110, 181, 89, 152; 433/103, 133

[56] References Cited

U.S. PATENT DOCUMENTS

| | | | |
|---|---|---|---|
| 1,810,844 | 6/1931 | Morel | 310/156 |
| 2,516,901 | 8/1950 | Morrill | 310/156 |
| 2,522,233 | 9/1950 | Merrill | 310/156 |
| 2,919,359 | 12/1959 | Luenberger | 310/86 |
| 3,164,735 | 1/1965 | Lichowsky | 310/156 |
| 3,343,017 | 9/1967 | Pop | 310/43 |
| 3,638,055 | 1/1972 | Zimmermann | 310/43 |
| 3,754,844 | 8/1973 | Nusser | 310/43 |
| 3,873,861 | 3/1975 | Halm | 310/43 |
| 3,974,408 | 8/1976 | Fehr | 310/103 |
| 4,053,983 | 10/1977 | Flatland | 433/133 |
| 4,115,040 | 9/1978 | Knorr | 310/104 |
| 4,128,527 | 12/1978 | Kinjo | 310/43 |
| 4,339,874 | 7/1982 | McCarthy | 310/156 |

Primary Examiner—R. Skudy
Attorney, Agent, or Firm—Morgan, Finnegan, Pine, Foley & Lee

[57] ABSTRACT

A brushless electric micromotor comprised of a rotor, a shaft and a tube-like part and permanent magnets rotatably mounted and hermetically sealed in a rotor housing, said shaft being supported in bearings. The permanent magnets have their co-axial surfaces coated with a layer of an electrically conductive metal. The micromotor further comprises a stator co-axially surrounding the rotor housing and comprising field windings regularly arranged with equal angular distances in the stator housing made of magnetic material.

10 Claims, 2 Drawing Figures

BRUSHLESS ELECTRIC MICROMOTOR

This invention relates to brushless electric micromotors and, more particularly, to brushless electric micromotors for use with hand held tools, for example, dental drills.

Brushless electric micromotors having position sensors for detecting the rotor position and for controlling the current supply to the field windings for effective starting and synchronizing the motor are known. Such motors require additional space for housing the sensor means and sealing of the motor with the sensors is difficult.

The instant invention provides a brushless electric micromotor without position sensors, eliminates the need for added motor housing sensor space and sensor sealing and provides a motor completely sealed, practically maintenance-free, which is easy to assemble and has a long life-span. The electric micromotor of the present invention includes a rotor with a shaft, a tube-like member and permanent magnets rotatably mounted and hermetically sealed in a rotor housing. The shaft is supported in bearings mounted in the housing. The housing is provided with the tube-like member which is made of magnetic material and carries the permanent magnets. The permanent magnets have coaxial surfaces coated with a layer of an electrically conductive metal. The stator co-axially surrounds the rotor housing and includes the stator part made of magnetic material and field winding coils arranged regularly with equal angular distances and embedded in insulating material.

The hermetically sealed rotor housing consists of a plastic capsule sealed at one of its ends by a flange-like part. Because the rotor is hermetically sealed, contaminates from the outside are excluded. The rotor bearings may be lubricated for their total life-span. The assembly of the motor is simplified. There are no brushes or sensors to install or assemble. The rotor is simply inserted into the stator.

The field windings of the stator of the micromotor of the instant invention are also embedded in plastic material. Thus, the entire motor is sealed, completely electrically isolating the motor and allowing the motor to be used in environments exposed to liquids and fluids.

In one embodiment of the motor of the present invention, three stator field windings are employed and are arranged regularly in an angular distance of $2\pi/3$ from each other. The windings are powered with three-phase current with the phases differing from each other by $2\pi/3$. A rotating field is thus generated. Because the rotor of the micromotor of the instant invention is completely sealed in the rotor housing, the motor of the invention is particularly adapted for transmitting torque by means of a magnetic coupling between the rotor shaft and the tool to be driven.

In another embodiment of the invention, one end of the housing is provided with an axial cavity. The permanent magnets of the rotor extend inside of the housing and into the axial cavity. A device provided with magnets is fitted into the axial motor housing cavity so that a magnetic coupling is formed between the permanent rotor magnets extending into the axial cavity and the magnets of such device for transmitting the torque of the motor shaft to the device and by the device to a tool outside the motor housing.

The micromotor, as aforesaid, operates without position sensors. The starting of the motors and the synchronization of the magnetic rotor field with the stator field is achieved through a layer of conductive metal, i.e., copper, on the outside surfaces of the permanent magnets of the rotor.

Figure 2:
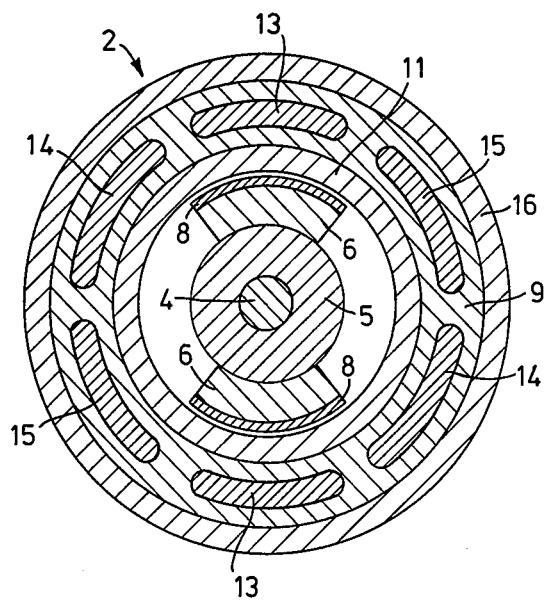

The instant invention will be more fully described and will be better understood from the following description, taken with the accompanying drawings in which FIG. 1 is a side view, in section, of the micromotor of the present invention; and FIG. 2 is a sectional view taken at II, II, FIG. 1.

As best shown in FIG. 1, the motor unit of the inventive micromotor comprises a hermetically sealed rotor housing 10 with bearings 3, 3', shaft 4, tube-like part 5, 6, and permanent magnets 6' in housing 10 and making up a freely rotating rotor. Housing 10 consists of capsule 11 and sealing flange part 12. Capsule 11 and flange part 12 are preferably produced by molding of plastic material. Capsule 11 is hermetically sealed by the sealing flange part 12. The use of synthetic plastic material, at the same time, electrically isolates the rotor. Rotor housing 10 is inserted into the stator unit, generally designated 2. Shaft 4 is rotatably supported by bearings 3, 3', lubricated and sealed in housing 10.

Tube-like part 5 of magnetic material with attached permanent magnets 6, 6', provided with a layer of conductive metal 8, such as copper, on their surfaces, is mounted on shaft 4. Stator unit 2 co-axially surrounds motor housing 10 and comprises field windings 13, 14, 15 regularly arranged with equal angular distances of $2\pi/3$ (FIG. 2) and, when connected to a tri-phase electric power supply (not shown in the drawing), providing a phase difference between phases of $2\pi/3$, generates a rotating magnetic field. Field windings 13, 14, 15 are completely embedding in synthetic resinous material 9, which is an electric insulator, and are arranged in the stator housing 16 made of magnetic material to close the magnetic circuit with magnets 6, 6'.

In the operation of the instant motor, stator unit 2 generates a rotating magnetic field in the manner well-known in the art. When starting the motor, the necessary torque for the rotor has to be generated.

In the motor of the instant invention, the torque for starting the motor is generated without using a position sensor. Copper layer 8 on the outer surfaces of the magnets 6, 6' of the rotor permits the starting of the rotor and the synchronization of the rotating field of the stator with the magnetic field of the rotor. If the rotor rotates at a different speed that the field of the stator, eddy currents are generated in copper layer 8. The reaction of the stator field and the field induced by the eddy currents causes the rotating torque of the rotor non-synchronous. The non-synchronous torque drives the rotor up to a speed which permits the synchronization of the rotor.

The motor speed depends on the rotation speed of the stator field, which is controlled by the frequency of the supply current. The frequency of the supply current can easily be adjusted by means well-known in the art.

The diameter of the rotor is very small so that very high speeds can be achieved. Speeds comparable to the speeds of air turbines can be attained. For example, if the power supplied to the stator has 2000 cycles, a speed of 120,000 rpm of the rotor is attained with a dipol motor. The high speed, as well as the complete electric insulation of the rotor and the stator of the invention motor, allow a wide field of applications especially in fields where high speed and safety are of importance, as, for example, in the field of dental surgery and microsurgery.

As the micromotor of the invention has a completely sealed rotor, magnetic coupling is provided, as described hereinafter. The ends of rotor magnets 6, 6' are extended by portions 7 beyond bearing 3 at the end of motor shaft 4 and into the recess of cavity 17. Cavity 17 is shaped to support bearing 3 in its inner part. Outer cavity 18 of cavity 17 is shaped to form a co-axial cavity and receives the end of shaft 21 having disc 22 having magnets 24, 26 for magnetic coupling of rotor shaft 4 and shaft 21. Extensions 7 of magnets 6, 6' of the rotor are arranged to be housed in the recessed part of 17 and adjacent to the wall of housing 10. The extensions 7 of magnets 6, 6' in rotor housing 10, when motor is started, extending beyond bearing 3 and the end of motor shaft 4 and into the outer periphery of cavity 17 for the magnetic coupling with magnet 24, 26 on disc 22 of shaft 21. Thus, the magnetic field of magnet extension 7, with the magnetic field of magnets 24, 26 of disc 22, cause shaft 20 to rotate as the motor shaft rotates.

The exact shape of motor 16, and especially the shape of a mechanically connected device, depends on the field of application and is not part of this invention. In FIG. 1, motor 16 with coupling flange 19 for mounting the micromotor on device 20.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A brushless electric micromotor comprising a rotor having a shaft, a tube-like member of a magnetic material on said shaft and permanent magnets mounted on said tube-like member, said shaft, said tube-like member and said magnets being rotatably mounted in a hermetically sealed in a rotor housing, said shaft being supported at its opposite ends in bearings mounted in said housing, said permanent magnets having outer surfaces coated with a layer of an electrically conductive metal, said permanent magnets extending beyond one of the ends of said shaft and the bearing supporting said shaft end and forming a magnetic drive for a second shaft magnetically coupled thereto and a stator unit co-axially surrounding said rotor housing, said stator unit having a housing of magnetic material and field winding coils in said magnetic material stator housing arranged regularly in said stator housing coaxially around said rotor with equal angular distances between said coils, said coils being embedded in insulating material, the hermetically sealed rotor housing being provided with a recessed end forming an axial, cylindrical cavity facing to the outside, and the end of said permanent magnets extend into a recess formed inside of said rotor housing by said recessed end and the outside wall of said housing, said end of said permanent magnets extending into said sleeve forming one part of a magnetic coupling for transmitting the torque of said rotor to said second shaft having a magnetic coupling counterpart.

2. The micromotor of claim 1 wherein said rotor housing is made of an insulating plastic material.

3. The micromotor of claim 1 wherein said field winding coils in said stator unit are embedded in, and the interspaces between said coils completely filled with, an insulating plastic material.

4. The micromotor of claim 1, 2, or 3, wherein the angular distance between said field winding coils is $2\pi/3$ and said coils are connected to a tri-phase electric power supply having a phase difference between the phases of $2\pi/3$ for creating a rotating field.

5. The micromotor of claim 1, 2 or 3 wherein the hermatically sealed rotor housing comprises a capsule and a flange.

6. The micromotor of claim 1, 2 or 3 wherein the electrically conductive layer on the permanent magnets is a copper layer.

7. The micromotor of claim 2 wherein said field winding coils of said stator are embedded in, and the interspaces between said coils completely filled with, an insulating plastic material.

8. The micromotor of claim 8 wherein the angular distance between said coils is $2\pi/3$ and said coils are connected to a tri-phase electric power supply having a phase difference between the phases of $2\pi/3$ for creating a rotating field.

9. The micromotor of claim 7 wherein the hermetically sealed rotor housing comprises a capsule and a flange.

10. The micromotor of claim 7 wherein the electrically conductive layer on the permanent magnets is a copper layer.

* * * * *